United States Patent
Crews et al.

(10) Patent No.: US 9,355,532 B2
(45) Date of Patent: May 31, 2016

(54) AUTOMATED BANKING MACHINE THAT IS OPERABLE TO AUTOMATICALLY DETECT AND STORE SERVICE ACTIVITIES

(71) Applicant: Diebold-Self Service Systems division of Diebold, Incorporated, North Canton, OH (US)

(72) Inventors: Timothy Crews, Alliance, OH (US); Grant Thornberry, Louisville, OH (US); Songtao Ma, Wadsworth, OH (US); Darla Rowland, Akron, OH (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 14/120,334

(22) Filed: May 14, 2014

(65) Prior Publication Data

US 2014/0339302 A1    Nov. 20, 2014

Related U.S. Application Data

(60) Provisional application No. 61/822,949, filed on May 14, 2013.

(51) Int. Cl.
*G07F 19/00* (2006.01)
*G06Q 10/00* (2012.01)

(52) U.S. Cl.
CPC ............ *G07F 19/209* (2013.01); *G06Q 10/20* (2013.01); *G07F 19/20* (2013.01); *G07F 19/206* (2013.01)

(58) Field of Classification Search
USPC ............... 235/379, 381; 705/43; 902/8, 9, 14
See application file for complete search history.

(56) References Cited

U.S. PATENT DOCUMENTS

| | | | |
|---|---|---|---|
| 7,195,172 B1 * | 3/2007 | Scarafile et al. | 235/486 |
| 7,240,827 B2 * | 7/2007 | Ramachandran et al. | 235/379 |
| 2007/0138256 A1 * | 6/2007 | Coventry | 235/379 |
| 2008/0251578 A1 * | 10/2008 | Jansing | 235/379 |
| 2010/0063776 A1 | 3/2010 | Kayani | |
| 2013/0282576 A1 * | 10/2013 | Kinsey | 705/43 |

FOREIGN PATENT DOCUMENTS

| | | |
|---|---|---|
| EP | 1 672 595 A1 | 6/2006 |
| WO | WO 02/054223 | 11/2002 |
| WO | WO 2004/061787 | 7/2004 |
| WO | WO 2004/114056 | 12/2004 |

* cited by examiner

*Primary Examiner* — Ahshik Kim
(74) *Attorney, Agent, or Firm* — Black, McCuskey, Souers & Arbaugh, LPA

(57) ABSTRACT

In an example embodiment, an automated banking machine that is operable to detect signals corresponding to a plurality of service activities carried out on a transaction function device. Data representative of the plurality of service activities is stored in the transaction function device's data store.

14 Claims, 8 Drawing Sheets

| DETECTING SERVICING ACTION | | |
|---|---|---|
| DEVICE | ACTION | REMOVE |
| CARD READER | TEST | |
| RECEIPT PRINTER | CLEAR JAM | |
| | TEST | |
| | EMPTY BIN | |
| | ALIGN | X |
| CASH DISPENSER | CASH RELOAD | |
| CHECK ACCEPTOR | REPLACE BELT | |

FIG. 4

| RELATING SERVICING | | |
|---|---|---|
| DEVICE | ACTION | ADD |
| RECEIPT PRINTER | NEW MODULE | |
| | CLEAN | X |
| | NEW CARTRIDGE | |
| | NEW PAPER ROLL | |
| | NEW PAPER SENSOR | X |
| | BELT ADJUSTMENT | |

FIG. 5

| NEW SENSOR | |
|---|---|
| SENSOR #1 | |
| SENSOR #2 | X |
| SENSOR #3 | |
| SENSOR #4 | |

FIG. 6

| P/N | ENA OSD S/N | ENA MYLAR S/N | ENA. REV. | VAL. TYPE | VAL. S/N | VAL. REV | GSL TECH | OSD TEST | RD TOOL TRX TEST* (SEE BELOW) |
|---|---|---|---|---|---|---|---|---|---|
| 00-104862-00F | XX88000133 | 54019241 | 2 | JCM | 12010013720 | 9 | R.CLARKE | PASS | PASS |
| 00-104862-00F | XX88000148 | 54019240 | 2 | JCM | 12010013720 | 9 | R.CLARKE | PASS | PASS |
| 00-104862-00F | XX88000137 | 58018560 | 2 | JCM | 12010013720 | 9 | R.CLARKE | PASS | FAILURE MODE 1 |
| 00-104862-00F | XX88000146 | 8016705 | 2 | JCM | 12030015801 | 9 | R.CLARKE | PASS | PASS |
| 00-104862-00F | XX88000141 | 57017145 | 2 | JCM | 12030015801 | 9 | R.CLARKE | PASS | PASS |
| 00-104862-00F | XX88000135 | 8021677 | 2 | JCM | 12010013720 | 9 | R.CLARKE | FAILURE MODE 3 | NOT TESTED |
| 00-104861-00F | GR59004467 | 88014174 | 5 | JCM | 12030015801 | 9 | R.CLARKE | PASS | FAILURE MODE 2 |
| 00-104861-00F | GR59011933 | 54011933 | 2 | BEB | 0325166 | | R.CLARKE | PASS | FAILURE MODE 5 |
| 00-104861-00F | XX88000139 | 8006318 | 2 | BEB | 0325166 | | R.CLARKE | PASS | PASS |
| 00-104861-00F | | | | BEB | 0325166 | | R.CLARKE | FAILURE MODE 4 | NOT TESTED |

FAILURE MODE:
FAILURE MODE 1: JAM ES13 1ST TRX 612
FAILURE MODE 2: 1ST TRX 816 NOTES UNABLE TO PASS THROUGH CI (DIDN'T CLAMP CLOSED TIGHT), NO CODE. TP08 TRX 817
FAILURE MODE 3: UPON INSTALLATION, OSD REPORT 1C MAIN CCA OR FAILED SENSOR/1C01
FAILURE MODE 4: SA11 ENA DOES NOT BEEP WHEN UNDOCKED AND DOCKED – MAIN CCA ERROR
FAILURE MODE 5: RT06 TRX 1613, RT06 TRX 1734, RT06 TRX 1735, RT06 TRX 1737

*RDTOOL TEST CONSISTED OF RUNNING 2,000 NOTES WITH 10 NOTES PER TRX (200TRX).

ENGINEERING NOTES:
OSD SERIAL NUMBER(SERIAL NUMBER SAVED ON MAIN CCA) SHOULD MATCH MYLAR SERIAL NUMBER (ENA SN)

ENA 8021677 – INITIALLY HAD 1C01 FAILURE WITH POWER UP – WENT AWAY AFTER CALIBRATION – NO PROBLEM FOUND
EFC HISTORY – SHOWS MULTIPLE 1C01 FAULTS – USUALLY DUE TO NOT CALIBRATING OR CALIBRATING WITH A BLOCKED/UNPLUGGED SENSOR

ENA88014174 – INITIALLY HAD 1C01 FAILURE WITH POWER UP – WENT AWAY AFTER CALIBRATION – NO PROBLEM FOUND
EFC HISTORY – SHOWS 2 TRANSPORT SPEED FAULTS, AN ESCROW TAPE SPEED FAULT, AND RETURN TRANSPORT JAM

ENA 59004467 – WAS MISSING THE VALIDATOR MOUNTING SCREWS
FIRST TRANSACTION E102 – ALIGN TRANSPORT/PICKER STEPPER MOTOR CABLE WAS NOT FULLY SEATED – ALIGN TRANSPORT DID NOT RUN AFTER PLUGGIN IN CABLE FULLY THERE WERE NO MORE FAILURES
EFC HISTORY – SHOWS REAR TRANSPORT FAULTS FROM GDQA TESTING AND MULTIPLE ESCROW JAMS AND TAPE FAULTS
AFTER NOTICING THE ESCROW FAULTS I INSPECTED THE AREA CLOSER – I FOUND THAT THE IDLER ROLLERS EXITING ESCROW WERE SLIPPING (CAN CONTRIBUTE TO E107 FAULTS), SO I LOOSEND THE UPPER TRANSPORT BRACKETS AND ADJUSTED FOR BETTER DRIVE.

*ENGINEERING TESTING WAS 20 TRANSACTIONS OF VARIOUS STACK SIZES (10-25 NOTES) USING RAPTOR COMMANDER
EFC FAULT HISTORY FOR EACH ENA IS ON SEPARATE TABS

FIG. 9

| MFG DATE | INSTALL #1 | PULLED | 1ST REPAIR | INSTALL #2 | PULLED | 2ND REPAIR | INSTALL #3 | 3RD REPAIR | INSTALL #4 | PULLED | 4TH REPAIR | ENA WOW TESTING OCT-12 4 REAR TRANSPORT JAMS IN 2000 NOTES |
|---|---|---|---|---|---|---|---|---|---|---|---|---|
| AUG-10 | 6-JAN-11 | 18-JAN-11 | 10-FEB-11 | 8-FEB-12 | 27-FEB-12 | 5-MAR-12 | NO SP 101 | MAY-JUN 2012? | 14-JUL-12 | 19-JUL-12 | 24-AUG-12 | |

1ST REPAIR

| BRANCH | CALL NUMBER | PART NUMBER | DESCRIPTIO | SP101_SHIP_DATE | LAST_REPAIR_DATE | SP101_COMMENTS | COMMENTS |
|---|---|---|---|---|---|---|---|
| 8097 | 6825173 | SV104862000B | ASSY, ENA, W/VALIDATOR TYBE B, PA | 18-JAN-11 | | | UPPER CI MOTOR BRKT CAUSING NOTES TO JAM IN CI. FIELD FORMED BRKT. CLEANED-TESTS OK |

| SER NUM | MFG DATE CODE | 1ST_TIME_THRU? | NEW REPAIR DATE | REPAIR TYPE | BRIEF DESCRIPTION | REPLACED FAILED PARTS |
|---|---|---|---|---|---|---|
| GR59004467 | 1036 | YES | 10-FEB-11 | DOR | CANNOT DETERMINE | |

2ND REPAIR

| BRANCH | CALL NUMBER | PART NUMBER | DESCRIPTIO | SP101_SHIP_DATE | LAST_REPAIR_DATE | SP101_COMMENTS | COMMENTS |
|---|---|---|---|---|---|---|---|
| 8003 | 1565407 | SV104861000E | EAN, W/O VALIDATOR | 27-FEB-12 | 15-DEC-11 | | E107 ERRORS, INTERFACE MOVEMENT FAULTS ALSO REPLACED FAILED PARTS |

| SER NUM | MFG DATE CODE | 1ST_TIME_THRU? | NEW REPAIR DATE | REPAIR TYPE | BRIEF DESCRIPTION | REPLACED FAILED PARTS |
|---|---|---|---|---|---|---|
| 59004467 | 1036 | NO | 5-MAR-12 | DOR | CANNOT DETERMINE | |

3RD REPAIR

| BRANCH | CALL NUMBER | PART NUMBER | DESCRIPTIO | SP101_SHIP_DATE | LAST_REPAIR_DATE | SP101_COMMENTS | COMMENTS |
|---|---|---|---|---|---|---|---|
| | | 00104651000E | ASSY, ENA, W/O BAL PACKAGED | MAY-JUN 2012? | MAR 2012? | MISSING SP101 | JAMS AT ESCROW GOING BACK TO REJECT 2 WEEKS OLD |

| SER NUM | MFG DATE CODE | 1ST_TIME_THRU? | NEW REPAIR DATE | REPAIR TYPE | BRIEF DESCRIPTION | REPLACED FAILED PARTS |
|---|---|---|---|---|---|---|
| 59004467 | 1036 | NO | MAY-JUN 2012? | | MISSING SP101 | CANNOT DETERMINE |

Comments: PRETEST-CABLE LATCH SEITCH WAS DAMAGED ON UDD-REPLACED, HELICAL GERA ON ESCROW WAS DAMAGED-REPLACED, ESCROW STORAGE SPOOL WORN, REPLACED, CLEANED TEST FINAL OK Comments: CANNOT PRETEST-MISSING VALIDATOR AND DAMAGE TO UPPER TURN ASSY SIDE PLATE-UPPER ALIGN ASSY NOT ATTACHED JUST SITTING ON TOP OF ENA. REPAIRED DAMAGE-TESTED. NO FAILURES-UNIT TEST GOOD

4TH REPAIR

| BRANCH | CALL NUMBER | PART NUMBER | DESCRIPTIO | SP101_SHIP_DATE | LAST_REPAIR_DATE | SP101_COMMENTS | COMMENTS |
|---|---|---|---|---|---|---|---|
| 8003 | 2983804 | 00104861000E | ASSY, ENA, W/O BAL PACKAGED | 19-JUL-12 | MAY 2012? | CHRNIC ENA UNIT | PRETEST OK NFP, CRADLE FOR VALIDATOR MISSING SO I REPLACED IT, FINAL TEST OK ENA PULLED ON 19 JUL |

| SER NUM | MFG DATE CODE | 1ST_TIME_THRU? | NEW REPAIR DATE | REPAIR TYPE | BRIEF DESCRIPTION | REPLACED FAILED PARTS |
|---|---|---|---|---|---|---|
| 59004467 | 1036 | NO | 24-AUG-12 | DOR | NPF | 49-214543-CX4, 49-220929-C 49-223918-A, 49-220690-A |

FIG. 10

AUTOMATED BANKING MACHINE THAT IS OPERABLE TO AUTOMATICALLY DETECT AND STORE SERVICE ACTIVITIES

CROSS REFERENCE TO RELATED APPLICATIONS

This application claims the benefit under 35 U.S.C. §119 of U.S. Provisional Application No. 61/822,949 filed May 14, 2013, the disclosure of which is hereby incorporated by reference in its entirety.

This application is a related to U.S. application Ser. No. 13/405,667 filed Feb. 27, 2012, now U.S. Pat. No. 8,534,537, which is a continuation of U.S. application Ser. No. 12/583,886 filed Aug. 27, 2009, now U.S. Pat. No. 8,123,122, which is a continuation of U.S. application Ser. No. 12/070,984 filed Feb. 22, 2008, now U.S. Pat. No. 7,617,971, which is a divisional of U.S. application Ser. No. 11/504,478 filed Aug. 15, 2006, now U.S. Pat. No. 7,334,723, which is a continuation of U.S. application Ser. No. 10/722,067 filed Nov. 25, 2003, now U.S. Pat. No. 7,104,441, which claims the benefit of U.S. Provisional Applications: 60/429,249 and 60/429,250 filed Nov. 25, 2002; 60/429,476, 60/429,521, and 60/429,528 filed Nov. 26, 2002; 60/453,370 filed Mar. 10, 2003; and 60/465,733 filed Apr. 25, 2003. This application is related to U.S. Application Ser. No. 14/408,674 filed on Oct. 8, 2013, published as U.S. PG Publication No. 2014/0107836, that claims the benefit of U.S. Provisional application 61/710,997. The disclosures of these aforementioned applications are herein incorporated by reference in their entirety.

TECHNICAL FIELD

This disclosure relates to banking system machines that operate responsive to data read from data bearing records such as user cards.

BACKGROUND

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts, account balance inquiries, the payment of bills, the cashing of checks, the purchase of money orders, the purchase of stamps, the purchase of tickets, and the purchase of phone cards. The types of banking transactions a customer can carry out at an automated banking machine are determined by the capabilities of the particular banking machine, the capabilities of the system in which it is connected, and the programming of the machine by the entity responsible for its operation.

Other types of automated banking machines may be operated in other types of environments. For example certain types of automated banking machines may be used in a customer service environment, such as by service providers in a transaction environment (such as a bank) to carry out financial transactions. For example, certain types of automated banking machines may be used for purposes of counting and storage of currency notes, other financial instrument sheets, or other items that are received from or which are to be given to a customer, the dispensing of notes or other sheets, the imaging of checks or other financial instruments, and other types of transactions. Other types of automated banking machines may be used to validate items which provide the customer with access, value, or privileges, such as tickets, vouchers, checks, or other financial instruments. Other examples of automated banking machines may include machines which are operative to provide users with the right to merchandise or services in an attended or a self-service environment.

Some types of automated banking machines may be operated by merchants to carry out commercial transactions. These transactions may include, for example, the acceptance of deposit bags, the receipt of checks or other financial instruments, the dispensing of rolled coin, or other transactions required by merchants.

A common type of self-service automated banking machine used by consumers or customers is an automated teller machine ("ATM"). For purposes of this disclosure an automated banking machine, automated transaction machine, or an automated teller machine shall be deemed to include any machine that can be operated to automatically carry out transactions involving transfers of value.

Automated banking machines may include various types of transaction function devices. These devices are operated to carry out transactions. Different types of automated banking machines include different types of devices. Different types of devices enable an automated transaction machine to carry out different types of transactions. For example, some types of automated machines include a depository for accepting deposits while other automated machines do not. Some machines have a "touch screen" while others have separate displays and input buttons. Automated banking machines can also be fitted with devices such as cash and coin acceptors, statement printers, check validators, currency bill or note acceptors, thumb print readers, and other types of devices, while other machines do not include such devices.

OVERVIEW OF EXAMPLE EMBODIMENTS

In accordance with an example embodiment, there is disclosed herein an automated banking machine that is operable to detect signals corresponding to a plurality of service activities carried out on a transaction function device. Data representative of the plurality of service activities is stored in the transaction function device's data store.

BRIEF DESCRIPTION OF DRAWINGS

FIG. 4 shows a service interface display screen which indicates servicing actions detected by the machine.

FIG. 5 shows a service interface display screen which indicates additional servicing actions carried out by a servicer.

FIG. 6 shows an auxiliary (supplementary) service interface display screen that allows a machine servicer to input more detail concerning an additional servicing action performed.

FIG. 9 is a graphical display showing service data for transaction function devices including service history data.

FIG. 10 is an alternative graphical output showing service history data associated with a transaction function device used in an automated banking machine.

DETAILED DESCRIPTION OF EXAMPLE EMBODIMENTS

Figure 1:
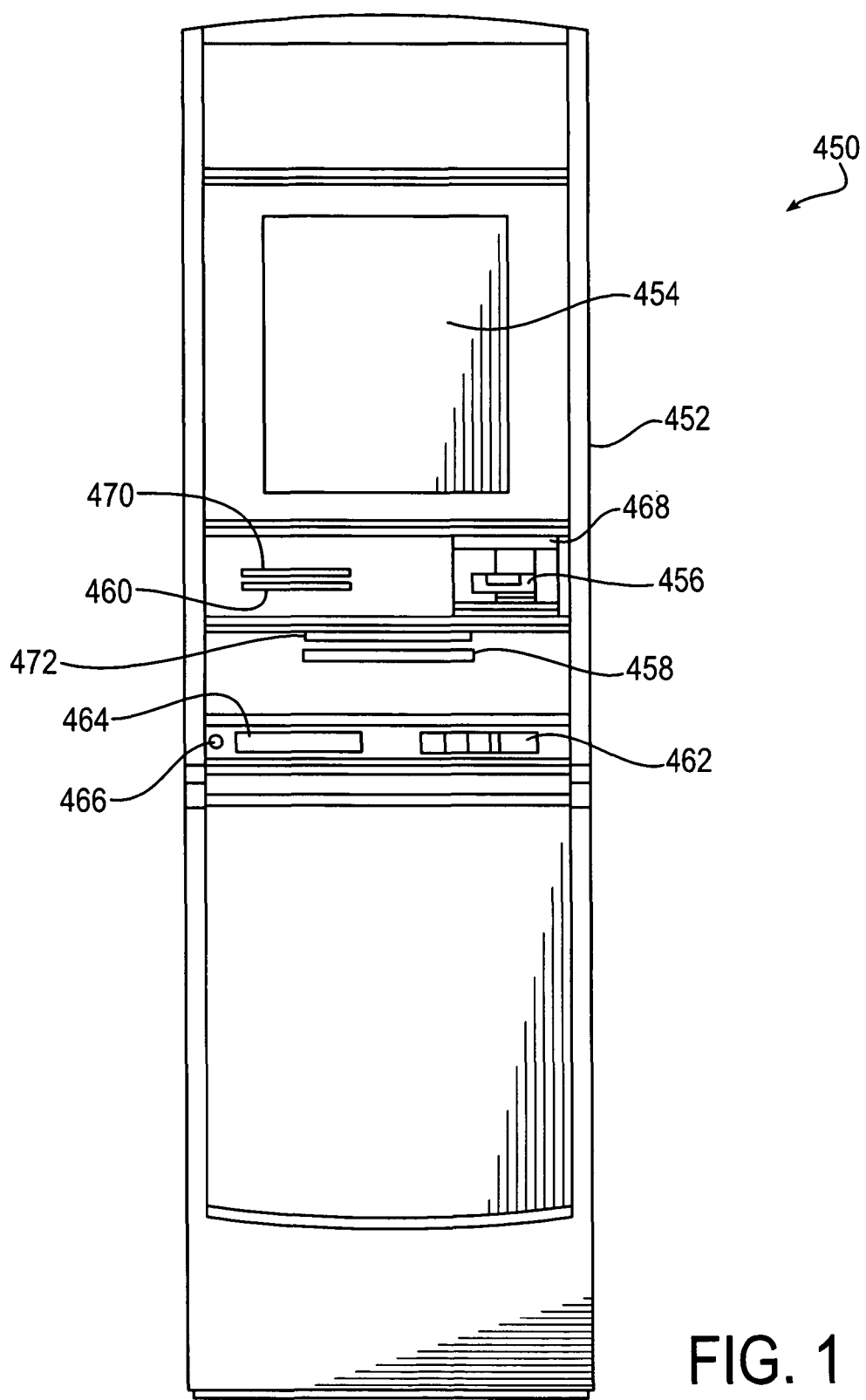
FIG. 1 shows a plan view of an alternative automated banking machine.

Referring to the drawings, FIG. 1 shows an example of an automated banking machine 450. Machine 450 is a machine that operates in response to data read from user cards and is operative to cause financial transfers to or from financial accounts. It should be understood, however, that machine 450 is but one example of many types of automated banking machines to which the features described may be applied.

Machine 450 includes a housing 452. Housing 452 is operative to support a number of devices that are used in connection with the functions performed by the machine. The example machine includes a touch screen display 454. Display 454 is used as both an output and an input device in the embodiment. Display 454 can be used to provide users with instructions for operation of the machine, as well as graphical representations of selections or options that users may select and thereby provide inputs to the machine. In an example embodiment, the machine 450 further includes a card reader which is operative to read cards such as credit or debit cards. The card reader is coupled with a card reader slot 456 through which user cards pass during operation of the machine. Card readers of embodiments may read magnetic stripe cards, chip cards, wireless cards or other types of articles from which data corresponding to user accounts may be read.

In an example embodiment, the machine 450 further includes an opening 458. Opening 458 is associated with one or more devices within the machine. The transaction function devices associated with opening 458 may include, for example, a sheet dispenser such as a dispenser of cash in the form of currency bills. Alternatively opening 458 may be associated with a transaction device that prints coupons, scrip, tickets, traveler's checks or other sheet items that are delivered through the opening 458 to users of the machine. Alternatively opening 458 may be associated with transaction function devices that receive sheets from users of the machine. This may include, for example, check acceptors that receive, image and analyze financial checks input to the machine by machine users. Alternatively or in addition opening 458 may be associated with a transaction function device in the form of a bill validator which is operative to validate bills received through the opening. In still further alternative arrangements opening 458 may be associated with a transaction function device that operates as a currency recycler. The currency recycler may receive currency sheets from users, validate them as genuine and store genuine currency notes in the machine for later dispensing to users who request cash from the machine. Of course these transaction function devices are example and in other embodiments other types of devices may be used.

In an example embodiment, the machine 450 further includes a receipt opening 460. Receipt opening 460 is associated with a receipt printer in the example machine. The receipt printer operates to provide the user with a receipt for transactions conducted at the machine. The embodiment further includes a keypad 462. Keypad 462 serves as a user input device to receive inputs from users of a machine. Such inputs may include alphanumeric inputs, transaction selection inputs or other types of inputs as are required in operation for the machine. The example keypad may include alphanumeric keys, function keys or other suitable keys that users can manually contact to provide inputs that will cause desired operation of the automated banking machine.

In an example embodiment, the machine 450 further includes an auxiliary touch screen display 464. Auxiliary display 464 may be like that described in U.S. patent application Ser. No. 13/687,023 filed Nov. 28, 2012 the disclosure of which is incorporated herein by reference in its entirety. The auxiliary display 464 may include a touch screen display that is usable by individuals in wheelchairs or that otherwise prefer to operate the machine and provide inputs through the auxiliary display which is more readily shielded from observation by unauthorized persons. The example machine further includes a port 466. Port 466 of the embodiment may include a headphone jack. The headphone jack may be utilized by persons who are blind and who may operate the machine in response to audible instructions provided through connection of headphones to the headphone jack. In other embodiments the port 466 may include a wireless port which enables near distance wireless communication between the machine and a device carried by a user. This may include, for example, a wireless headphone arrangement that enables a person operating the machine in response to voice guidance inputs received through headphones to receive machine operation instructions through the wireless port. Alternatively or in addition the port 466 may communicate with a mobile wireless device such as a smart phone. Such communication with a smart phone may enable a user to provide inputs and/or receive outputs from the machine using a smart phone or other portable wireless device. It should be understood that these devices of machine 450 are example and in other types of automated banking machines, other types of devices may be utilized in connection with machine operation.

In an example embodiment, the machine 450 includes a plurality of visual indicators. The visual indicators will selectively provide outputs that can be visually observed by users and which are controlled to facilitate operation of the machine. In particular embodiments, a visual indicator 468 is positioned adjacent to the card slot 456. Another visual indicator 470 is positioned adjacent to the receipt opening 460. Yet another visual indicator 472 is positioned adjacent to the opening 458. Of course it should be understood that these are mere examples and other types of automated banking machines may include greater or lesser numbers or other types of indicators.

Visual Indicators 468, 470 and 472 may operate to selectively illuminate at times before, during and after transactions in order to facilitate user operation of the machine. Some indicators, arrangements and the associated banking machine may include features such as those described in U.S. Pat. No. 7,677,444 the disclosure of which is incorporated herein by reference in its entirety.

In an example embodiment an automated banking machine (e.g., an ATM) is operable to automatically determine what particular service activity has been carried out on it, and then automatically report service data (which corresponds to the determined service activity) to a remote computer (e.g., a host service computer). The automated collection and communication of service data by the machine frees up the service person from having to manually enter many (if not all) of the service activities the service person performed on the machine. Thus, a more accurate (electronic) record of machine servicing may be achieved. Also, the daily rate of a service person's completed machine services can be increased.

In an example embodiment the machine includes numerous sensors (or detectors) associated with one or more machine computers. The machine computer includes one or more processors comprising software programs, applications, agents, instructions, etc. The machine computer is associated with at least one data store. The machine computer may be a specific computer that is designated for receiving or collecting servicing data detected by the sensors.

In the example embodiment some sensors are affiliated with machine components, which enables the sensors to identify (e.g., by name, function, and/or location) which component was affected by which service activity. A machine component or part can have a sensor built in, attached thereto, or located nearby. For example, a machine component can have a wireless indicator (such as an RFID tag) built in or attached thereto. A nearby reader or sensor (e.g., an RFID tag reader) can be positioned to wirelessly read data (e.g., component name, function, and/or location) provided by a component's RFID tag.

Other sensors are associated with service access points. For example, respective sensors can detect manual entry to certain interior areas, movement of components, absence/installation of components, etc. That is, the machine is structurally and functionally configured such that the sensors/detectors are positioned to sense which machine parts were adjusted, removed, changed/replaced, and when the part handling activity occurred. Many different types of sensors can be used in the example embodiments, including motion sensors, proximity sensors, pressure sensors, metal detectors, etc. Sensed characteristics can include (or the absence of) any of magnetic, inductance, capacitance, pressure, vibration, sound frequency, radiation, light, etc.

Various types of sensors can be used to detect service activity. A sensor (or sensor array) can include a photoelectric optical sensor with an emitter/receiver. A sensor (or sensor arrangement) can include a camera. A sensor/processor arrangement can be used that compares captured images to detect motion, such as in an operational manner similar to a computer mouse. The motion detected can be that of a machine part or a machine servicer's body part (e.g., hand). Another motion sensing arrangement may use a sensor that can detect whether an (electrical) contact was broken. Machine parts can have one or more sensors built therein (integral therewith).

In other example embodiments, a sensor can detect whether a service input device (e.g., a button, lever, etc.) was operated (e.g., pushed) by a service person. For example, an array of service buttons may be located near a particular machine component. Different buttons respectively correspond to different services (e.g., testing, cleaning, replacing, etc.) performed on the particular component. Servicer input provided through contact with a specific button indicates to the machine a specific service that the component received (or is about to receive). For example, servicer input provided through contact with an alignment-designated button can indicate that the component was realigned.

Figure 2:
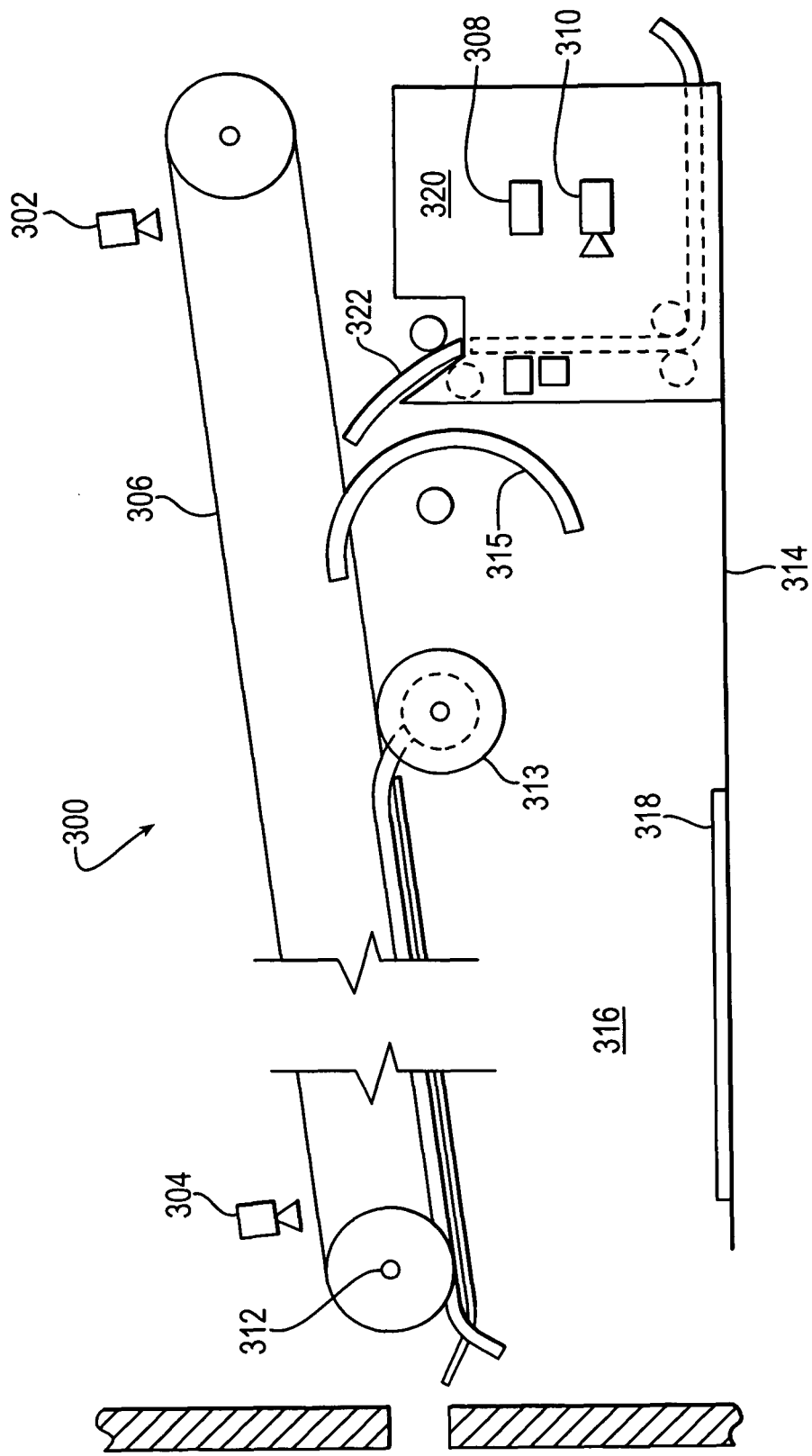
FIG. 2 shows sensors strategically positioned to detect servicing activity associated with a machine component and pieces thereof.

For example, FIG. 2 shows service sensors 302, 304, 308, 310 associated with a receipt printer assembly 300. Also shown are a shaft 312, a roller 313, a base 314, a movable guiding gate 315, a receipt storage area, 316, a retracted receipt 318, a printer 320, and a newly printed receipt 322. The sensors 302, 304 can be operated during a service session to individually detect whether the belt 306 was moved. A sensor's detection of belt movement can be an indication to a system processor that the belt 306 was tested and/or cleaned.

The system processor can also use combined data received from both sensors 302, 304 to deduce (or predict) information regarding belt servicing. That is, information received from multiple sensors may be used by a system processor to conclude that a belt was removed. For example, the processor can be programmed to determine whether at the same time (simultaneously during the service session) neither sensor 302, 304 detected the presence of the belt 306. Such a lack of detection can indicate to the system computer that the belt 306 was removed, and thus considered as replaced. As discussed later, this automatically detected information (belt replacement) can later be presented (via a display) to the servicer for verification or confirmation. Thus, the servicer has ample opportunity to edit the presented information to ensure an accurate record of the servicing.

Figure 3:
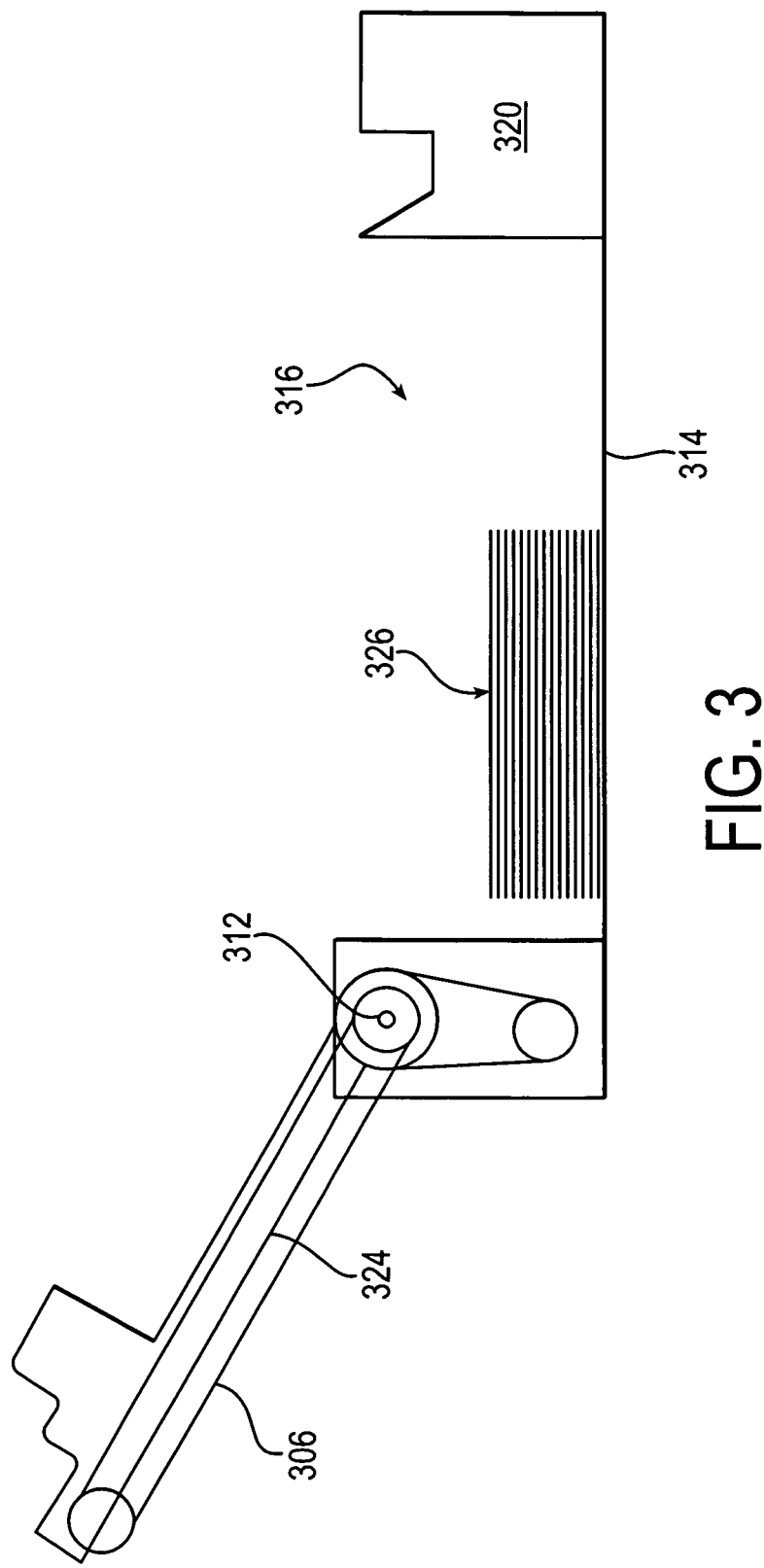
FIG. 3 shows how sensing an activity related to one machine part can be used as an indicator that a service activity was carried out on another machine part.

FIG. 3 shows another service sensing feature associated with the receipt printer assembly 300. The belt 306 is supported by a frame 324 that can be pivoted about the shaft 312. frame 32 may support the sensors 302, 304. The frame 324 needs to be moved to allow access to the receipt storage area (bin) 316. A presented receipt that was not taken by a customer can be retracted back into the machine and then stored in the bin 316. In FIG. 3, the bin 316 holds a stack 326 of retracted receipts that need to be removed from the machine by a service person.

The sensing of movement of the frame 324 (e.g., rotation of the frame about the shaft 312) can be taken by the system as an indication that the bin 316 was accessed, and thus emptied. Hence, a sensing of movement of the frame 324 can indicate to the system programming that the bin 316 was emptied. That is, sensing of one machine part (e.g., the frame) led to a service activity being automatically applied to another machine part (e.g., the bin).

As can be appreciated, detecting that specific machine structures were moved in a specific order (or manner) can be an indication to (or be determined by) a system processor that a certain service activity was performed. Again, any service activity that is automatically detected (or determined) by the machine (which includes sensors, processor, etc.) can be displayed to the servicer for verification before it is officially part of the machine's service record.

The service sensors are in operative connection with the machine computer. The machine computer is structurally (hardware) and functionally (software) operable to receive information sensed by the sensors. The information (servicing data) collected by the machine computer enables a machine service history to be compiled. The machine computer can be loaded with software instructions that allow the computer to produce the machine service history from the collected servicing data. Alternatively, the machine computer can communicate the servicing data to one or more computers that are remotely located from the machine. A remote computer can then cause generation of the machine service history. The service history can reflect service activity involving maintenance, modifications, updates, repairs, etc. The service history can also reflect the service dates/times, machine ID, and servicer ID of each service activity for each automated banking machine.

As can be seen, the processors of the service analysis system are programmed to cause the collection, storage, and processing of machine service data. The processors run programs (e.g., computer readable instructions, firmware, etc.) that allow for the data communications involving a machine's sensors, a machine computer, and the remote computers.

An example embodiment includes a software program that can analytically review network wide service data. The service data allows the history of jams, breakdowns, and malfunctions to be analyzed with regard to common components of a plurality of automated banking machines. That is, some machines may use the same type of machine component (e.g., same model printer). The system wide analysis of service data provides statistical results regarding the commonly used components. Patterns of jams, breakdowns, and malfunctions can be statistically recognized or determined by the software program or application that reviews the service data for the machines. Thus, when a component is likely to become a problem (e.g., malfunction) in the future can be predicted within a mathematical range of error. As a result, predictive maintenance can be optimally performed (soon) before the predicted problem with the component actually occurs. The predictive maintenance servicing can be carried out during a regularly scheduled servicing for machine maintenance. Hence, the up time (operational) time of the machine (and its components) can be increased. On the other hand, the predicting features of the system also allows for the unnecessary replacement of (still) viable machine components to be decreased.

Also, data collected by the sensors is not limited to service data. Component operating data can also be collected. For example, the sensors allow for tracking the number of operational cycles of a respective machine component. Later during the servicing of the same machine, the service person can access the service/repair/operation history of the respective machine component to view its history. The service person can also pose questions to the system regarding the particular component. For example, the service person may request the system to compare the service history (or portions thereof) of the particular component to the average service history for the same component across the entire network of machines. The system may also be programmed to automatically provide the service person with such comparisons (without the need to request). This real time access to machine/component history allows a service person to make a more accurate decision while still in the field (i.e., at the machine site).

A service interface is available to the service person during machine servicing. The interface can be provided through different types of displays, including a machine display and a display (e.g., a mobile phone, computer tablet, etc.) carried by the servicer. In an example embodiment the service interface outputs a graphical display which indicates or explains each service function that the machine detected as being performed by the servicer (during that current servicing session). For example, a detailed list of sensed services can be presented to the service person. The service interface allows the servicer to provide verifying input that confirms that the displayed service list is accurate and/or complete.

FIG. 4 provides an example of an interface display 330 which shows the servicing actions detected by the machine. As can be seen, the display 330 indicates a plurality of detected service activities, including the card reader was tested, a bin for storing not taken receipts was emptied, the cash dispenser was loaded with cash, and the check acceptor received a new belt.

The display screen in FIG. 4 also allows the service person to edit the present list of service actions, including an ability to remove any listed action that was not actually performed. For example, the display 330 incorrectly shows that the receipt printer was aligned. This alignment action can be easily removed from the list by the servicer providing input to the remove box located next to the indicated alignment. The provided input is represented (in FIG. 4) by an X in the box. The action removing input will cause the final servicing list (used for the machine servicing history) to not include an alignment of the receipt printer. Again, a removal input (to the remove column) can be provided via a touch screen, a mouse, a keyboard, etc.

The service interface application (or software program) can be run by a processor of an automated banking machine, with the interface-produced displays presented through a machine display. Alternatively, as discussed in more detail later, the service interface application can be run by a processor of a portable computing device (e.g., a smart phone) carried by the servicer, with the displays presented through a display of the portable computing device.

Some types of machine servicing acts may be unable to be sensed by the many sensors. For example, while a service person was replacing one component, a visual inspection of another (nearby) component may have also been performed (from a distance) by the same service person. Such service activity may not have triggered a detection of any moving part (e.g., a machine part or a servicer part). The example service interface allows the servicer to input additional (undetected) service activity so that the service record (list) can be fully accurate. For example, the displayed interface includes an option that allows a service person to input (through the interface) a particular service activity that was not detected by the machine sensors. These additional servicer-provided inputs (e.g., typed notes, service codes, etc.) can then be part of the official service record for the machine.

The service interface program can additionally present the servicer with a displayed list of other (undetected) service acts (e.g., visual inspections of certain components) that the servicer may have carried out during the present machine repair and/or maintenance operation. The service interface allows the servicer to manually select specific service acts from the displayed list(s). For example, selection may be made through manual contact with a touch screen display. Again, the service interface display allows a servicer to provide (via manual input corresponding to a selection from a displayed list of selectable service activities) the official service record of a machine with additional information regarding service activity that was not automatically detected by the machine.

FIG. 5 provides an example of an interface display 334 which shows related servicing actions that may have been carried out by the servicer, but were not detected by the machine. As can be seen, the display screen 334 shows servicing actions related to a receipt printer. The display 334 allows the service person to easily add any listed action that was additionally performed on the receipt printer. An action can be added by the servicer providing input to the add box located next to the indicated action.

In the example shown in FIG. 5, the servicer provided an adding input to indicate that the receipt printer additionally received both cleaning and a new paper sensor. Verification of the input is represented by an "X" mark being displayed in the respective add boxes. Again, an X (or other type of visual indicator or symbol) can be provided via a touch screen, mouse, keyboard, etc. The adding input will cause the final servicing list (used for the machine servicing history) to include the additional servicing actions to the receipt printer.

The service interface programming can cause one or more additional interface display screens to be displayed as a result of user input to the (related servicing) table shown in FIG. 5. For example, FIG. 6 shows an additional interface display 336 that is provided (displayed) as a result of the servicer adding (to FIG. 5) the data indicating that the receipt printer received a new paper sensor. The display screen shown in FIG. 6 includes a displayed list 338 of the receipt printer's paper sensors. The new sensor list allows the servicer to easily indicate which of the sensors was replaced. Thus in response to user input, the service interface can provide one or more secondary displays which help the user indicate which specific part was (or will be) replaced by the servicer. Likewise, secondary displays can also be provided to help (by breaking down choices to a selectable level) a servicer notify or indicate (not only specific parts but also) which specific service actions or activities were provided during the machine service session.

As can be appreciated, an example servicer interface displays allow modification (adding and removing service actions) to a service record. Thus, the service interface enables a servicer to more efficiently provide an accurate history of: a machine's current servicing session, a machine's entire servicing record, and a network of machines' servicing record.

The service interface also allows the servicer to use different search methods to quickly locate (or select) certain machine components that may have received undetected service by the servicer. For example, the servicer can choose to find a particular component (e.g., receipt printer) by using an alphabetical grouping of (named) components. Once the component is found, the servicer can next use the displayed interface (e.g., such as the display interface shown in FIG. 5) to review a complete list of (selectable) services that are performable on that particular component. The service interface application links the particular component list to the particular component chosen by the servicer. That is, services that cannot be carried out on the particular component can be left off of the displayed services list. From the displayed (related servicing) list the servicer can select the (undetected) service activities that were also performed on the machine.

Figure 7:
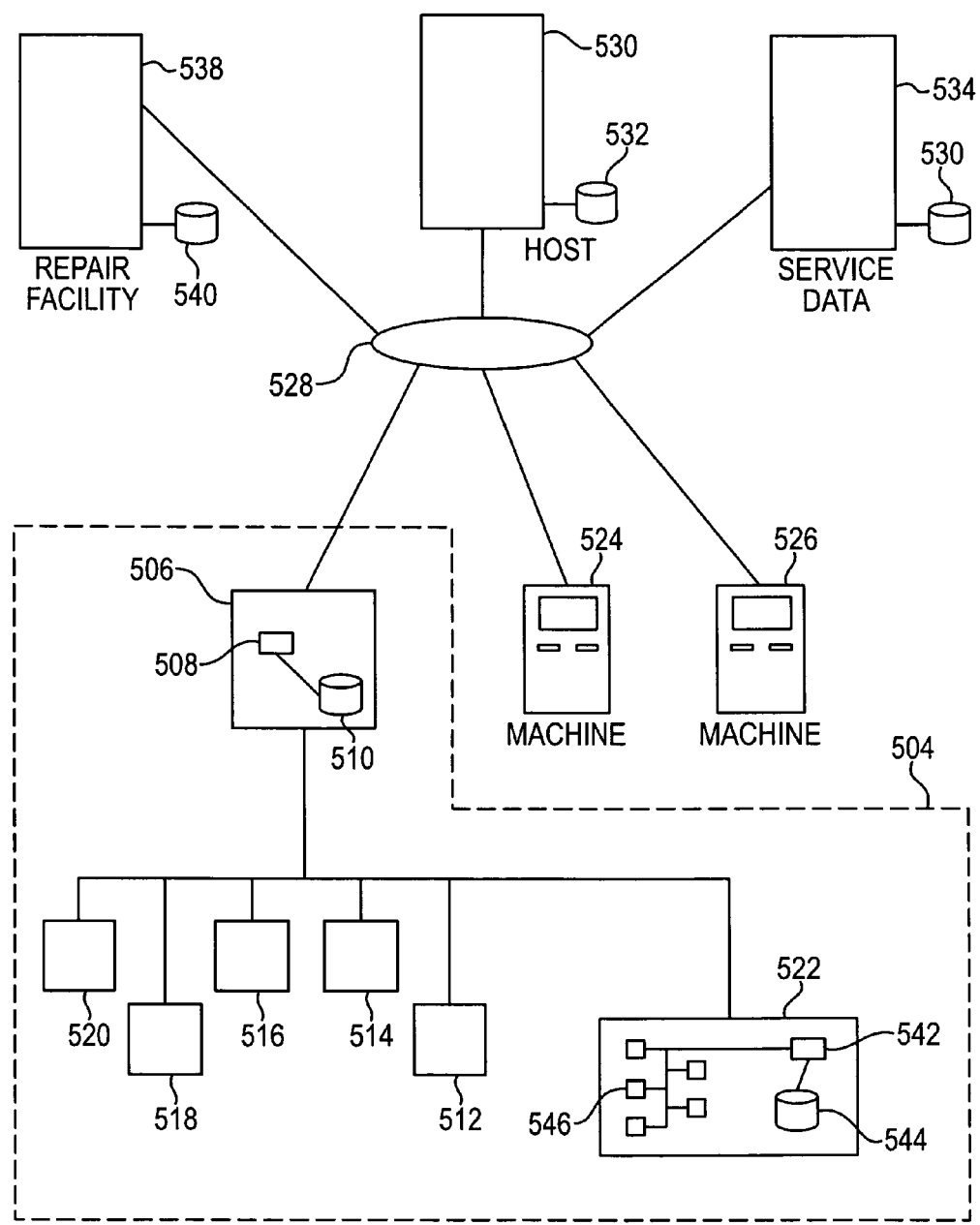
FIG. 7 is a schematic view of an alternative automated banking machine and system used in connection with recording service data for transaction function devices.

FIG. 7 schematically represents an example embodiment to facilitate diagnosis and repair of automated banking machine components. In an example embodiment, an automated banking machine schematically represented 504 includes a terminal processor 506 which is alternatively referred to herein as a controller or computer. The terminal processor 506 includes at least one processor 508 that is in operative connection with at least one data store 510. The terminal processor 506 is in operative connection with multiple devices in the machine. The devices may include for example a card reader 512 and a display 514. Other devices in the automated banking machine may include transaction function devices that operate to at least one of receive or dispense sheets. Such transaction function devices may include for example a cash dispenser 516, a check acceptor 518, a cash recycler 520 and a receipt printer 522. It should be understood that the devices shown in the example automated banking machine 504 are merely representative of such devices that may be included in various types of machines and other embodiments may include other or different types of devices.

In an example system in which machine 504 is used, machine 504 as well as other automated banking machines schematically indicated 524 and 526 communicate with one or more remote computers via a network schematically indicated 528. One or more networks 528 enable the automated banking machines to communicate with a remote transaction authorizing host computer 530. Host computer 530 is operative to authorize transactions which result in financial transfers based on card data and/or other data input by users at the automated banking machines. Host computer 530 is also operative to store in at least one data store 532 data corresponding to financial accounts and to record financial transfers that are carried out through operation of the machines.

The automated banking machines are also in operative connection with at least one service data collecting remote computer 534. The service data collecting remote computer is operative in the example embodiment to receive data concerning service activities that are performed on automated banking machines and the devices included therein. The service data collecting computer 534 is operative to store service history data in at least one data store 536. The service history data store is operative to store data associated with service activities that are carried out at the automated banking machines. Further in the embodiment the service history data store is operative to record for each transaction function device as well as other selected devices, data concerning service activities that are performed on the particular device and the times at which such service activities are performed.

Further in the embodiment the system in which the automated banking machines are used includes at least one repair facility computer 538. In the embodiment the repair facility computer 538 is operatively associated with a facility where automated banking machine devices undergo repairs, including the replacement of components and other changes to the particular devices. The repair facility computer 538 is in operative connection with at least one data store 540 which is used to store data regarding repairs or changes made to transaction function devices and other devices that are repaired at the repair facility. As shown in the example embodiment the repair facility computer 538 and the service data collecting computer 534 of the embodiment are in operative connection so as to facilitate the storage and recovery of service data related to machine components therein. Of course it should be understood that this arrangement is example and in other embodiments other embodiments may be used.

As represented by receipt printer 522, the receipt printer which operates as a transaction function device of the machine includes at least one device processor 542. The device processor is in operative connection with at least one device data store 544 which is part of the transaction function device. The device data store 544 of the example embodiment is operative to store programmable device instructions for controlling operation of the device. The device data store is also operative to store local device data which corresponds to conditions which the device has encountered and service activities that are conducted on the particular device.

In the embodiment the device 522 includes a plurality of sensors 546. Sensors 546 are operable to automatically detect actions and/or conditions that correspond to service activities performed on the device 522. For example in some embodiments the sensors are operative to detect movement of components which correspond to particular service activities. Likewise embodiments are operative to detect different types of motion or the presence or absence of components which correspond to particular types of service activities. Further in other embodiments sensors are operative to detect electrical connection and/or disconnection of electrical parts or other components that are electrically connected in the device 522. Such electrical connections or disconnections are usable to identify different types of service functions. Of course other types of sensors may be included as appropriate to detect the types of service activities that are to be automatically detected or otherwise recorded in the course of service activities.

In still other embodiments input devices such as manual input devices, wireless input devices, machine readable data input devices or other items may be provided to receive inputs and generate signals that correspond to service activities that are performed with respect to the device. Such components can be used to receive data regarding service activities in those situations where the sensors are not configured to automatically detect the service functions. Further it should be understood that in embodiments the device 522 is in operative connection with the terminal processor 506 and the display or other devices which can receive inputs that correspond to service activities performed by servicers.

In the embodiment the device processor is operative responsive to signals received from the one or more sensors to determine the selected one of a plurality of detectable service activities that is performed on the particular device. The device processor 542 is operative to store the data corresponding to the service activities in the device data store 544. Further in some embodiments the sensors are operative to receive part identifying data such as serial numbers or other port type data associated with mechanical or electrical parts that are either removed from or installed in the device. For example, optical character recognition software, bar code analysis software or other software that can resolve data from imaging or reading sensors may be used. Identifying data associated with the particular parts are also stored in association with the service activity in the device data store.

Also in example embodiments the device processor performs a clock function. In the embodiment the device processor is operative to store a time value in association with each of the detected service activities. The storage of the time value along with the other service activity data corresponds to a time line of service activities that have been performed on the particular device. This stored time line data can be rendered graphically or otherwise provided through visual outputs through a display, printer or other device so as to provide a representation of each of the service activities that have been performed on the particular device along with information on when each particular service activity was performed. Such timeline data may prove valuable in providing a service history that can facilitate determining the root cause of problems that are associated with a particular device.

In the example automated banking machine 504, the device processor 542 and the terminal processor 506 are operative to cause the data corresponding to service activities performed on the particular device to be sent to the service data collecting computer 534. The service data collecting computer of the embodiment is operative to record service activities performed not only on the particular automated banking machine, but also in connection with each transaction function device of the machine. This example approach operates to track historical data associated with particular devices so that the data is persistent and maintained even if the particular device is refurbished and installed in a different automated banking machine. The capability to recover the history of malfunctions and related service activities associated with a given device enables servicers to more readily identify the source of problems that may be occurring with a given device. It may also indicate an appropriate long term fix to prevent repeat problems from happening again with regard to the particular device. In addition the ability to review service activities for an overall population of similar devices enables identifying the particular cause of malfunctions that may be present across an entire population of similar devices. This enables correction of the problem in the manner that improves the overall performance of the entire population of such devices. It should be understood that although these features have been discussed in conjunction with a transaction function device in the form of a receipt printer, the same principles described can apply to any device included in the machine that is susceptible to a need for periodic repair and which may determine and store data regarding service activities. Therefore for purposes of this application, a transaction function device will be deemed to refer to any type of device included in an automated banking machine that has the capability to determine repair activities associated with the machine and/or to store data corresponding thereto either in a device data store and/or in a service history data store in associated relation with the particular device.

Figure 8:
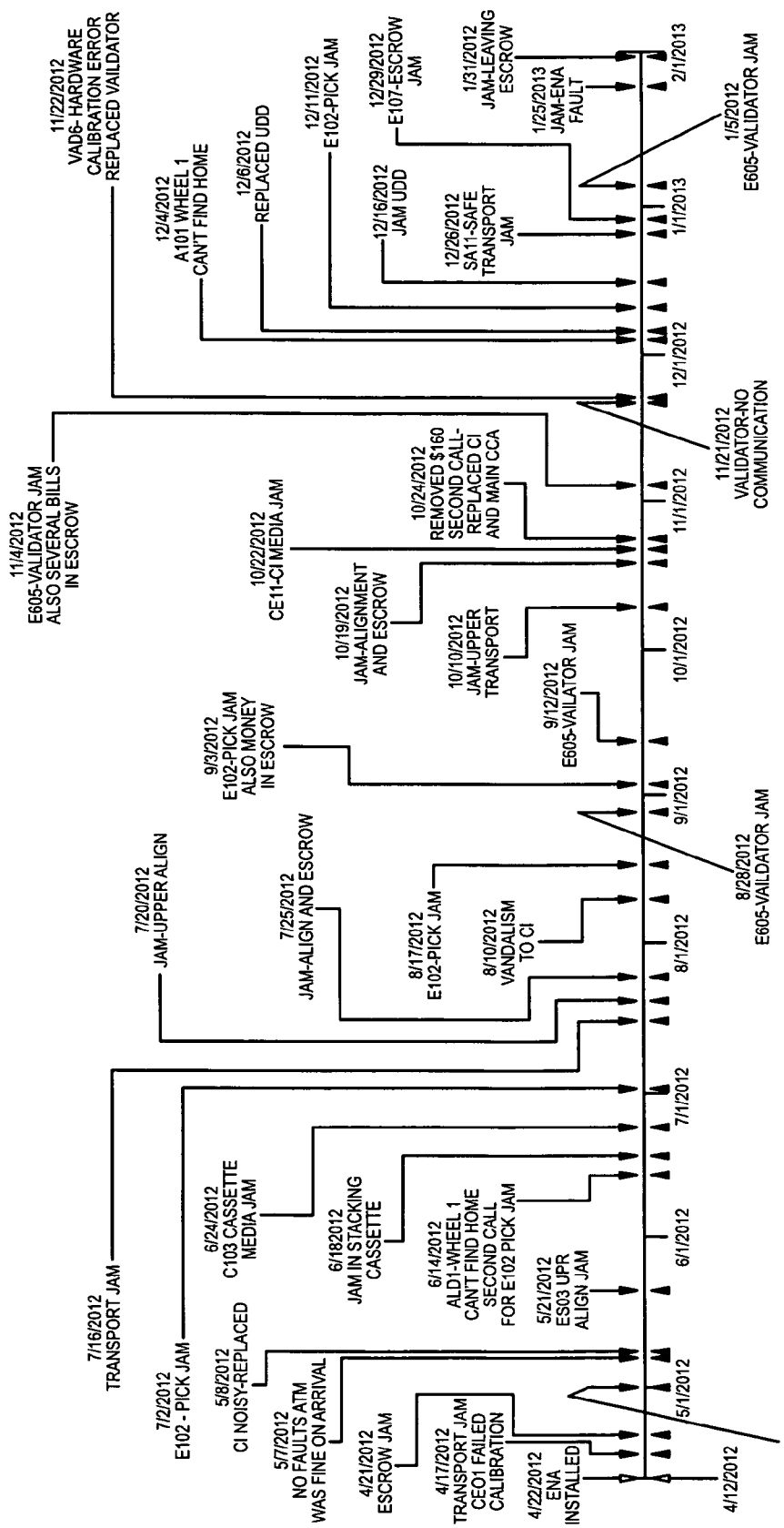
FIG. 8 is a graphical representation of a timeline showing service data associated with a particular transaction function device.

In embodiments, an automated banking machine which includes the example device 522 may operate responsive to one or more inputs to provide a graphical representation of the timeline to service personnel. This can be done through operation of the device processor and the terminal processor to cause such graphical representations to be output on the display of the machine or alternatively on a notebook computer, smart phone or other device that can provide the graphical representation of the timeline. FIG. 8 represents one example graphical representation of such a timeline as could be provided on an automated banking machine display. As can be appreciated similar graphical representations may be provided in connection with displays associated with the service data collecting computer 534 and/or the repair facility computer 538. Alternative graphical representations of timeline data may include other or different types of data related to service activities. For example FIG. 10 shows another example of a timeline for a particular device having a given serial number. This alternative graphical rendering which includes additional data and comments related to repairs also includes information that servicers input into a data store in connection with service activities and can later be used to identify the problems associated with particular devices.

In embodiments transaction function devices that exhibit problems or that cannot be reliably repaired in a field environment may be removed from the machine and replaced with a similar device. The removed transaction function device may then be shipped to a repair facility where it can be tested, rebuilt or refurbished as necessary. In such a repair facility service activities made to the transaction function device are also recorded through operation of the device processor or other machine and stored in the device data store. In addition test equipment or other equipment that is connected to the device during the course of testing and repairing the device may also operate to obtain such data on service activities made and to include such data in the repair facility computer 538. The repair facility computer captures the data on the service activities and the replacement of items for numerous different types of devices. The service repair facility computer also operates to communicate the information regarding the devices to the service data collection computer 534 so that the various repair activities associated with each transaction function device and the time at which each repair was made, are consistently stored in the service history data store 536.

Further in embodiments the repair facility computer 538, service data collecting computer 534 or other connected computer may operate in accordance with its programming to analyze the service history data for a plurality of similar devices. Such a computer may operate to provide reports concerning devices to identify particular or related problems that are recurring and the associated repair activities that were conducted to try to correct the issues. Such a computer may operate to identify transaction function devices of the same type and to analyze the "worst of the worst" (WOW) of the particular population of deployed devices. The computer may operate to generate reports providing information on such devices as well as the effect of repair activities in avoiding further problems. FIG. 9 includes an example of such a report for a transaction function device known as an enhanced note acceptor (ENA). As can be appreciated by reviewing the information concerning the repair activities, common problems may be identified and approaches to resolving the issues can be implemented so as to minimize the need for future repairs and to increase reliability of performance of the devices. Of course these approaches are example and in other embodiments other approaches may be used.

The example embodiments of the automated transaction machines and systems described herein have been described with reference to particular software components and features. Other embodiments may include other or different software components which provide similar functionality.

Thus, the features and characteristics of the example embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

It should be understood that language which refers to a list of items such as "at least one of A, B or C" (Example 1) means "at least one of A, B and/or C." Likewise it should be understood that language which refers to a list of items such as "at least one of A, B and C" (Example 2) means "at least one of A, B and/or C." The list of items in Example 2 is intended not to require one of each item. The lists of items in both Examples 1 and 2 can mean "only one item from the list or any combination of items in the list." That is, the list of items (in both Examples 1 and 2) can mean only A, or only B, or only C, or any combination of A, B and C (e.g., AB, AC, BC, or ABC).

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

The invention claimed is:

1. Apparatus comprising:
   an automated banking machine that comprises
   a reader,
   a transaction function device, the transaction function device having a data store,
   a computer associated with the machine and in communication with the transaction function device,
   wherein the automated banking machine is operable to automatically cause financial transfers responsive at least in part to data read from data bearing records,
   wherein the machine includes a reader that is operable to read data usable to identify a financial account,
   wherein the computer is operable to cause a financial transfer from the financial account, and employs the transaction function device for the financial transfer responsive to determining that data read by the reader corresponds to a financial account on which a transaction is authorized to be conducted through operation of the machine,
   wherein the machine is operable to detect signals corresponding to a plurality of service activities carried out on the transaction function device,
   wherein data representative of the plurality of service activities corresponding to the detected signals is stored in the transaction function device's data store;
   wherein the machine is operable to automatically sense at least some of the plurality of service activities carried out on the transaction function device;
   wherein the machine is operable to automatically send data corresponding to the plurality of service activities carried out on the transaction function device to a service data collecting remote computer; and
   wherein the service data collecting remote computer is operable to store data corresponding to the plurality of service activities carried out on the transaction function device in at least one remote service history data store.

2. The apparatus according to claim 1, wherein the transaction function device is operable to one of a group consisting of dispense sheets from the machine, receive sheets to the machine, and both dispense sheets from the machine and receive sheets to the machine.

3. An apparatus comprising:
   an automated banking machine that comprises
   a reader,
   a transaction function device, the transaction function device having a data store,
   a computer associated with the machine and in communication with the transaction function device,
   wherein the automated banking machine is operable to automatically cause financial transfers responsive at least in part to data read from data bearing records,
   wherein the machine includes a reader that is operable to read data usable to identify a financial account,
   wherein the computer is operable to cause a financial transfer from the financial account, and employs the transaction function device for the financial transfer responsive to determining that data read by the reader corresponds to a financial account on which a transaction is authorized to be conducted through operation of the machine,
   wherein the machine is operable to detect signals corresponding to a plurality of service activities carried out on the transaction function device,
   wherein data representative of the plurality of service activities corresponding to the detected signals is stored in the transaction function device's data store;
   wherein the machine is operable to automatically sense at least some of the plurality of service activities carried out on the transaction function device; and
   wherein the transaction function device includes a plurality of sensors,
   wherein a first sensor is associated with a first device component, wherein the first sensor is operable to detect service activity performed on the first device component, wherein a second sensor is associated with a second device component, and wherein the second sensor is operable to detect service activity performed on the second device component.

4. The apparatus according to claim 3, wherein the first sensor is operable to detect service movement of the first device component, and wherein the second sensor is operable to detect service movement of the second device component.

5. The apparatus according to claim 4, wherein the first sensor includes a first motion sensor, and wherein the second sensor includes a second motion sensor.

6. The apparatus according to claim 3, wherein the first sensor is operable to detect a change in an electrical connection to an electrical part of the transaction function device.

7. The apparatus according to claim 6, wherein the first sensor is operable to detect replacement of the electrical part with a replacement electrical part.

8. The apparatus according to claim 7, wherein the first sensor is operable to detect identifying data associated with the replacement electrical part.

9. The apparatus according to claim 3, wherein the transaction function device includes a device processor, wherein the device processor is in operative connection with the transaction function device's data store, wherein the device processor is operable to determine data representative of a particular service activity performed on the transaction function device responsive at least in part to data obtained from one of the first and second sensors, and wherein the device processor is operable to cause data representative of the particular service activity to be stored in the at least one device data store.

10. The apparatus according to claim 9, wherein the device processor is operable to perform a clock function, wherein the device processor is operable to store data corresponding to a time value in associated relation with data corresponding to a particular service activity in the transaction function device's data store.

11. The apparatus according to claim 10, wherein the data stored in the transaction function device's data store is usable to produce a timeline including a plurality of service activities carried out on the transaction function device and a relative time each such service activity was performed.

12. The apparatus according to claim 11, wherein the automated banking machine further includes a display, and wherein the display is operable to output at least one visual representation of the time line.

13. An apparatus comprising:

an automated banking machine that comprises a reader, a transaction function device, the transaction function device having a data store, a computer associated with the machine and in communication with the transaction function device, wherein the automated banking machine is operable to automatically cause financial transfers responsive at least in part to data read from data bearing records, wherein the machine includes a reader that is operable to read data usable to identify a financial account, wherein the computer is operable to cause a financial transfer from the financial account, and employs the transaction function device for the financial transfer responsive to determining that data read by the reader corresponds to a financial account on which a transaction is authorized to be conducted through operation of the machine, wherein the machine is operable to detect signals corresponding to a plurality of service activities carried out on the transaction function device, wherein data representative of the plurality of service activities corresponding to the detected signals is stored in the transaction function device's data store;

wherein the machine includes a plurality of sensors operable to automatically sense machine service activity on particular components of the transaction function device;

wherein the machine includes a processor;

wherein the processor is operable responsive at least in part to machine service activity sensed by at least one of the sensors, to cause service data to be sent to a service data collecting remote computer; and wherein the service data is indicative of service of at least one of the particular components.

14. Apparatus comprising:

an automated banking machine that comprises a reader, a transaction function device, the transaction function device having a data store, a computer associated with the machine and in communication with the transaction function device, wherein the automated banking machine is operable to automatically cause financial transfers responsive at least in part to data read from data bearing records, wherein the machine includes a reader that is operable to read data usable to identify a financial account, wherein the computer is operable to cause a financial transfer from the financial account, and employs the transaction function device for the financial transfer responsive to determining that data read by the reader corresponds to a financial account on which a transaction is authorized to be conducted through operation of the machine, wherein the machine is operable to detect signals corresponding to a plurality of service activities carried out on the transaction function device, wherein data representative of the plurality of service activities corresponding to the detected signals is stored in the transaction function device's data store wherein the automated banking machine further includes a display;

wherein the transaction function device further includes a device processor;

wherein the device processor is in operative connection with the transaction function device's data store;

wherein the device processor is operable to provide a clock function;

wherein the device processor is operable to store in the transaction function device's data store, local device data corresponding to a plurality of service activities and associated time values associated with the plurality of service activities;

wherein data stored in the transaction function device's data store includes a timeline of service activities, wherein the display is operable to output a visual graphic representation of the timeline.

* * * * *